United States Patent [19]
Yao et al.

[11] Patent Number: 5,793,638
[45] Date of Patent: Aug. 11, 1998

[54] WORK INSTRUCTION SYSTEM AND CONVEYANCE CONTROL SYSTEM IN PRODUCTION LINE

[75] Inventors: Yoshihiro Yao, Hirakata; Nobuo Miyamoto, Kameoka; Hideyuki Wakai, Toyonaka, all of Japan

[73] Assignee: Kabushiki Kaisha Komatsu Seisakusho, Tokyo, Japan

[21] Appl. No.: 620,756

[22] Filed: Mar. 18, 1996

Related U.S. Application Data

[63] Continuation of Ser. No. 84,239, filed as PCT/JP91/01752, Dec. 24, 1991, published as WO92/11114, Jul. 9, 1992, abandoned.

[30]   Foreign Application Priority Data

Dec. 25, 1990   [JP]   Japan .................... 2-405302

[51] Int. Cl.$^6$ .................................................. G06F 17/00
[52] U.S. Cl. ........................ 364/478.14; 364/468.06
[58] Field of Search .............................. 364/468, 478, 364/402, 403, 401, 406, 408, 468.05, 468.06, 468.03, 478.01, 478.09, 478.1, 478.13, 478.14, 478.15

[56]   References Cited

U.S. PATENT DOCUMENTS

| | | | |
|---|---|---|---|
| 4,821,197 | 4/1989 | Kenik et al. | 364/468 |
| 4,958,292 | 9/1990 | Kaneko et al. | 364/403 X |
| 5,063,506 | 11/1991 | Brockwell et al. | 364/403 X |
| 5,117,096 | 5/1992 | Bauer et al. | 364/403 X |
| 5,170,355 | 12/1992 | Hadavi et al. | 364/403 X |
| 5,204,821 | 4/1993 | Inui et al. | 364/403 X |

FOREIGN PATENT DOCUMENTS

| | | |
|---|---|---|
| 63-180452 | 7/1988 | Japan . |
| 271941 | 3/1990 | Japan . |
| 2136976 | 5/1990 | Japan . |

*Primary Examiner*—Thomas C. Lee
*Assistant Examiner*—Steven R. Garland
*Attorney, Agent, or Firm*—Welsh & Katz, Ltd.

[57]   ABSTRACT

An object of this invention is to provide efficient operations of a production line for producing finished products by performing working in which a variety of parts are selectively combined with one another during a plurality of processes. A semi-finished product produced in processes (1 and 2) is assigned to an article number; parts serving as raw materials, a supplier of the semi-finished product, or a destination of the semi-finished product or part are specified; and these specified data are distributed and transmitted from a higher level system (4) to respective control systems (5, 6, 7 and 8) as planned data to be executed and planned data to be received. The respective systems display the contents of the data thus transmitted on display sections (52, 62, 72 and 82), issue work instructions on the basis of the contents of the data, and output request instructions to the systems (6, 7 and 8) of the supplier side on the basis of the displayed contents or output supply instructions to the destination systems (5, 6 and 7). The system which has received the request instruction outputs a conveyance instruction to the conveyance control system (9) to convey the raw materials to the system which has output the request instruction, while the system which has received the supply instruction outputs a conveyance instruction to the conveyance control system (9) to convey the raw material from the system which has output the supply instruction.

2 Claims, 9 Drawing Sheets

| SCHEDULED PRODUCTION END TIME | ASSEMBLING SEQUENCE | PRODUCT NAME |
|---|---|---|
| ○ ○ ○ | 1 | XXX |
| ○ ○ ○ | 2 | YYY |
| ○ ○ ○ | 3 | ZZZ |

| ASSEMBLING SEQUENCE | PRODUCT# | PART# | NO. | DESTINATION |
|---|---|---|---|---|
| 1 | XXX | 12001 | 1 | 310 |
|   |   | 11002 | 1 | 320 |
|   |   | 01007 | 2 | 330 |
| 2 | YYY | 12001 | 1 | 310 |
|   |   | 11002 | 1 | 320 |
|   |   | 01007 | 2 | 330 |
| 3 | ZZZ | 12002 | 1 | 310 |
|   |   | 11004 | 1 | 320 |
|   |   | 01008 | 1 | 330 |
|   |   | 01009 | 2 | 340 |
| 4 |   |   |   |   |

| ASSEMBLING SEQUENCE | SEMI-FINISHED PRODUCT# | PART# | NO. | DESTINATION |
|---|---|---|---|---|
| 1 | 12001 | 11001 | 1 | 210 |
| | | 01003 | 2 | 220 |
| 2 | 12001 | 11001 | 1 | 210 |
| | | 01003 | 2 | 220 |
| 3 | 12002 | 11001 | 1 | 210 |
| | | 11003 | 1 | 220 |
| | | 01010 | 2 | 220 |
| 4 | | | | |

| KIT SEQUENCE | SEMI-FINISHED PRODUCT# | PART# | NO. | DESTI-NATION |
|---|---|---|---|---|
| 1 | 11001 | 0 1 0 0 1 | 2 | 1 1 0 |
|   |       | 0 1 0 0 2 | 4 | 1 2 0 |
| 2 | 11001 | 0 1 0 0 1 | 2 | 1 1 0 |
|   |       | 0 1 0 0 2 | 4 | 1 2 0 |
| 3 | 11002 | 0 1 0 0 4 | 3 | 1 1 0 |
|   |       | 0 1 0 0 5 | 4 | 1 3 0 |
|   |       | 0 1 0 0 6 | 4 | 1 4 0 |
| 4 | 11002 | 0 1 0 0 4 | 3 | 1 1 0 |
|   |       | 0 1 0 0 5 | 4 | 1 3 0 |
|   |       | 0 1 0 0 6 | 4 | 1 4 0 |
| 5 | 11001 | 0 1 0 0 1 | 2 | 1 1 0 |
|   |       | 0 1 0 0 2 | 4 | 1 2 0 |
| 6 | 11003 | 0 1 0 1 1 | 2 | 1 1 0 |
|   |       | 0 1 0 1 2 | 2 | 1 2 0 |
| 7 | 11004 | 0 1 0 1 3 | 3 | 1 1 0 |
|   |       | 0 1 0 1 4 | 3 | 1 2 0 |

|  | PROCESS "1" | PROCESS "2" | PROCESS "3" | PROCESS "4" |
|---|---|---|---|---|
| ARTICLE# "1" | MACHINING A | MACHINING B | WASHING | |
| ARTICLE# "2" | MACHINING C | WASHING | MACHINING A | WASHING |
| ARTICLE# "3" | MACHINING B | MACHINING C | WASHING | |
| ARTICLE# "4" | MACHINING D | WASHING | | |

WORK INSTRUCTION SYSTEM AND CONVEYANCE CONTROL SYSTEM IN PRODUCTION LINE

This is a continuation of application Ser. No. 08/084,239, filed Jun. 23, 1993, now abandoned, which is a 371 application of PCT/JP91/01752, filed Dec. 24, 1991 published as WO92/11114 Jul. 9, 1992, abandoned.

TECHNICAL FIELD

The present invention relates to a production line in which variety of parts are selectively combined during a plurality of processes to produce a finished product, and more particularly to the realization of a production system capable of efficiently performing working operations in various processes and conveyance operations between the processes and between the precesses and warehouse.

In a machining line in which machining operations such as cutting are performed on a single material to produce a finished product, the machining operations are performed according to a process chart such as shown in FIG. 10. FIG. 10, shows that a product of article no. "1" is produced by performing machining operation A in process "1", machining operation "B" in process "2" and washing process in the last process "3". Then, sequences of processes are shown for products of article nos. "2", "3", "4". . . . Since there is no process of combining a plurality of parts to produce a semi-finished product in the machining line, any semi-finished product can be specified by indicating an article number for a part which is the starting point of each process. For example, in process "2" for article no. 1, a series of conveying and machining processes is performed by indicating the operations that "conveying a semi-finished product of article no."1" in the preceding process "1" to the current process "2"", "performing machining operation B on the conveyed semi-finished product of article no. "1" to produce the semi-finished product of article no. "1", and "conveying the semi-finished product of article no. 1 to the next process "3" in the process "2" in which only article no. 1 is indicated.

In a production line such as a car production line where variety of parts are selectively assembled in a plurality of processes to provide a finished product, semi-finished products produced in the preceding processes and parts are assembled (assembled, welded, etc.) to produce a new semi-finished product. Therefore, if only article numbers of parts as minimum unit are given as in the case of machining line, a semi-finished product must be specified by the article numbers of the parts which constitute the semi-finished product. Thus, the process chart becomes complicated and the efficiencies of the conveying and working operations become decreased.

The present invention is made in view of such situation and an object of the present invention is to provide an work instruction system and a conveyance control system capable of efficiently operating a production line in which a finished product is produced by selectively assembling variety of parts in a plurality of processes.

DISCLOSURE OF THE INVENTION

According to the first aspect of the present inventions, in a production line in which a finished product is produced by selectively combining variety of parts stored in a warehouse in a plurality of processes, there are provided a higher level system which comprises first setting means for setting article numbers for respective kinds of the parts and for setting

2 article numbers for respective kinds of semi-finished products to be worked in the plurality of processes; second setting means for setting supplier identification codes indicative of respective warehouse and processes which supply the parts and semi-finished products in accordance with the article numbers of the parts and semi-finished products; third setting means for setting destination identification codes indicative of respective subsequent processes where the parts and semi-finished products are assembled in accordance with the article numbers of the parts and semi-finished products; and transmission means for transmitting an article number which corresponds to the supplier identification code to the warehouse or a process identified by the supplier identification code, and transmitting an article number which corresponds to the destination identification code, and a supplier identification code which corresponds to the article number to a process identified by the destination identification code on the basis of content set by the first, second and third setting means; and display means provided for each of the warehouse and the plurality of processes, for displaying the data transmitted from the higher level system, whereby work instruction and conveyance instruction for the parts and the semi-finished products are made on the basis of the data displayed on the display means.

Further, there are provided first, second and third setting means; a higher level system comprising a transmission means for transmitting an article number which corresponds to the supplier identification code, and a destination identification code which corresponds to the article number to the warehouse or a process identified by the supplier identification code, and transmitting an article number which corresponds to the destination identification code to a process identified by the destination identification code on the basis of content set by the first, second and third setting means; and display means provided for each of the warehouse and the plurality of processes, for displaying the data transmitted from the higher level system, whereby work instruction and conveyance instruction for the parts and the semi-finished products are made on the basis of the data displayed on the display means.

According to the second aspect of the present invention, there are provided a higher level system which comprises the same first, second and third setting means as in the first aspect of the invention; conveying means, responsive to a conveyance instruction, for conveying the parts and the semi-finished products among the warehouse and the plurality of processes; and means provided for each of the warehouse and the plurality of processes, for issuing a request instruction to request a part and a semi-finished product with corresponding article numbers to the warehouse or a process indicated by a supplier identification code, and when a request instruction is input, for issuing a conveyance instruction to the conveying means to convey the part and the semi-finished product with the requested article numbers to the process which has issued the request instruction on the basis of contents transmitted from the higher level system.

The first, second and third setting means and the transmission means are provided in a supervisory system, and there is provided means provided for each of the warehouse and the plurality of processes, for issuing a supply instruction to supply a part and a semi-finished product with corresponding article numbers to the warehouse or a process indicated by a destination identification code, and when a supply instruction is input, for issuing a conveyance instruction to the conveying means to convey the part and the semi-finished product with the article numbers to be supplied from the process which has issued the supply instruction on the basis of contents transmitted from the higher level system.

With the structure of the first aspect of the invention, not only a part which is the minimum unit of a finished product but also a semi-finished product obtained at each process is regarded as a part and given a new article number. In addition, a code to identify the supplier of that part or semi-finished product (for parts, the supplier is a warehouse and for semi-finished products, the supplier is a process in which the semi-finished product is to be produced) is given for each article number. In addition, a code to identify the destination of that part or semi-finished product (a process where the next working is to be performed) is given for each article number. The higher level system transmits to the respective processes and the warehouse the article numbers of the parts and semi-finished products required for assembly in the corresponding processes and the warehouse and the identification code of the supplier of those parts or semi-finished products, and the article numbers of the semi-finished product or part assembled in the corresponding processes and the warehouse. Each process displays the received data on the display means, which facilitates the conveyance of the parts or semi-finished product required for assembly in that process from the process or warehouse indicated by the supplier identification code to that process. Since the article numbers of the parts and semi-finished product required for assembly and the article number of a product into which those parts and semi-finished product are assembled are displayed, arrangements of works can be efficiently made. The higher level system transmits to the respective processes and the warehouse the article numbers of the parts or semi-finished products required for assembly in those processes and the warehouse and an identification code of the supplier of those parts, semi-finished products, and the article numbers and destination of the part or semi-finished product assembled in the respective processes and the warehouse. Each process and the warehouse display the received data on the display means so that the parts or semi-finished product with the article numbers assembled in that process can be easily conveyed to a process identified by a destination identification code. Since the article numbers of the parts and semi-finished product required for assembly and the article number of the article into which those parts and semi-finished product are assembled are displayed, arrangements of the works are efficiently made.

With the structure of the second aspect of the invention, each process knows the supplier identification code of the supplier of parts or semi-finished product required for assembly in that process on the basis of the received data, it is possible to issue to the warehouse or process indicated by the supplier identification code a conveyance instruction to convey the parts or semi-finished product with the appropriate number to that particular process. The process or warehouse which has received the instruction issues to the conveyance means a conveyance instruction to convey the semi-finished product or part produced in that process to the process which has issued the conveyance request instruction. Since each process and the warehouse knows the destination of parts or semi-finished product assembled in that process on the basis of the destination identification code of the received data, it is possible to issue a supply instruction to the process indicated by the destination identification code. The process which has received that supply instruction issues to the conveyance means a conveyance instruction to convey the semi-finished product or part to the process which has received the conveyance instruction from the process which is the supplier of parts or semi-finished product or the warehouse. Thus, the each process can be easily and efficiently supplied with required parts or semi-finished products.

BRIEF DESCRIPTION OF THE DRAWINGS

FIG. 6 illustrates production plan data to be input to a higher level system of FIG. 1;

FIG. 7 illustrates execution plan data prepared by the higher level system of FIG. 1 which shows the contents of main line execution plan data used in a main line control system of FIG. 1;

FIG. 8 illustrates execution plan data prepared by the higher level system of FIG. 1 which shows the contents of sub-line execution plan data used in a subline control system of FIG. 1;

FIG. 9 illustrates execution plan data prepared by the higher level system of FIG. 1 which shows the contents of execution plan data for a kit field used in a kit field control system of FIG. 1; and FIG. 10 illustrates a prior art involving a process chart in a machining line.

BEST MODE FOR CARRYING OUT THE INVENTION

An embodiment of an work instruction system and a conveyance control system in a production line according to the present invention will be described below with respect to the drawings.

Figure 1:
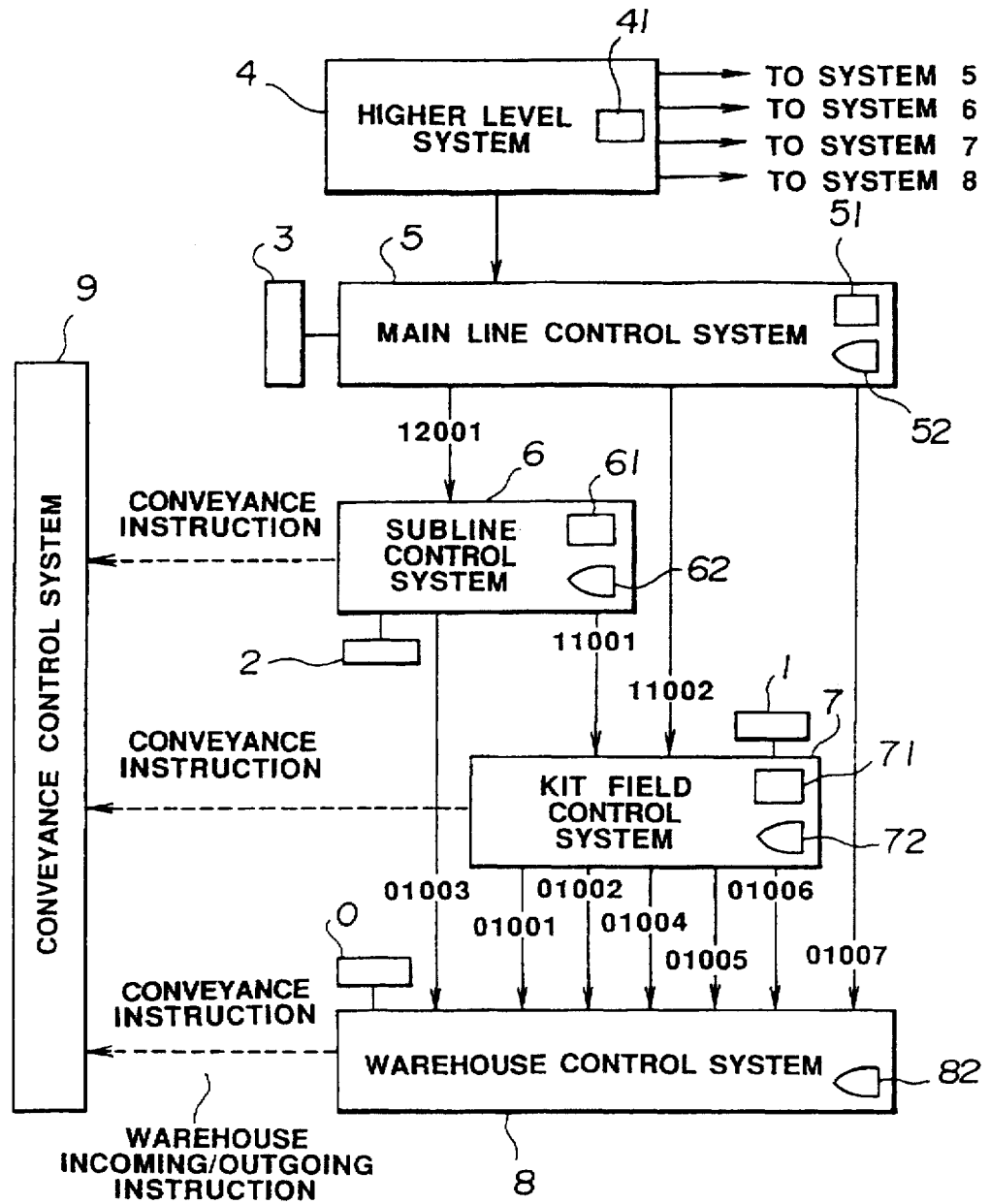
FIG. 1 is a block diagram illustrating a system configuration of a work instruction system and a conveyance control system in a production line according to an embodiment of the present invention.
Figure 2:
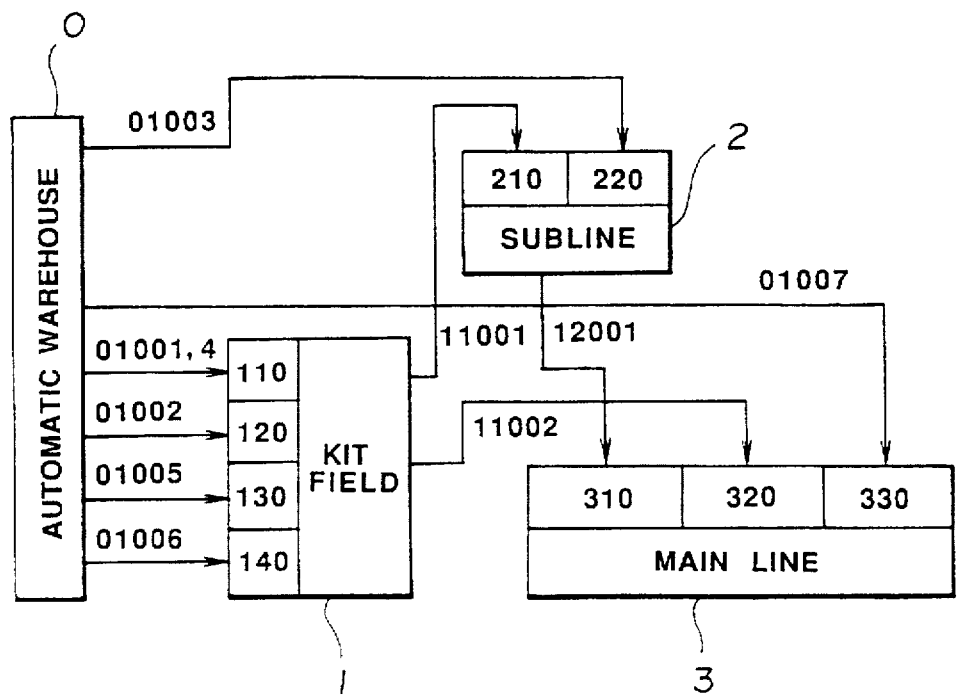
FIG. 2 schematically illustrates the structure of the production line of the embodiment of FIG. 1.

In the embodiment, it is assumed that the production line is a car production line. FIG. 2 schematically shows the structure of the car production line which essentially comprises an automatic warehouse 0 for storing a variety of parts as a minimum unit to be used for car production, from and into which the parts are automatically conveyed by a conveyance control system 9 to be described later; a kit field 1 for palletizing parts into a lump conveyed from the warehouse 0; a subline 2 for assembling a set of the parts conveyed from the warehouse 0 and the kit field 1 (hereinafter referred to as semi-finished products for convenience sake) into a semi-finished product such as an engine by tightening and bonding these parts; and a main line 3 for assembling parts conveyed from the warehouse 0, the semi-finished product palletized in the kit field 1 and a semi-finished product assembled in the subline 2 into a finished product, i.e., a car. For convenience of explanation, the line structure is simplified in the embodiment. For example, only one subline 2 is shown in FIG. 1. The automatic warehouse 0, kit field 1, subline 2 and main line 3 are interconnected by a passageway on which an unmanned carrier travels which is loaded with parts and semi-finished products in accordance with a conveyance instruction. The travel of the unmanned carrier is controlled by the conveyance control system 9 which will be described later by referring to FIG. 1. The kit field 1 is provided with stations 110, 120, 130 and 140 for the unmanned carrier in accordance with the kinds of parts conveyed from the warehouse 0. The subline 2 is provided with carrier stations 210, 220 in accordance with the kind of semi-finished products conveyed from the kit field 1 and the kind of the parts conveyed from the automatic warehouse 0. The main line 3 is provided with carrier stations 310, 320, 330 in accordance with the kind of the kind of semi-finished products conveyed from the subline 2, the kind of semi-finished products conveyed from the kit field 1 and the kind of the parts conveyed from the automatic warehouse 0.

FIG. 1 shows the system configuration of the production line of FIG. 2 which essentially comprises a higher level system 4 for preparing warehousing plan data required in the automatic warehouse 0 on the basis of a production plan in the production line, preparing execution plan data required in each of the processes performed in the kit field 1, subline 2 and main line 3 and integrally controlling the automatic warehouse 0, kit field 1, subline 2 and main line 3 on the basis of the prepared plan data; a main line control system 5 for controlling the main line 3 on the basis of the contents of the execution plan data prepared by the higher level system 4; a subline control system 6 for controlling the subline 2 on the basis of the contents of the execution plan data prepared by the higher level system 4; a kit field control system 7 for controlling the kit field 1 on the basis of the contents of the execution plan data prepared by the higher level system 4; an automatic warehouse control system 8 for controlling the kind, article number, position, etc., of parts in the warehouse 0 on the basis of the warehousing plan data prepared by the higher level system 4; and the conveyance control system 9 for controlling the travel of the unmanned carrier in accordance with conveyance instructions from the subline control system 6, the kit field control system 7 and the automatic warehouse control system 8, and for controlling the incoming and outgoing in the warehouse 0 in accordance with warehouse incoming/outgoing instructions from the automatic warehouse control system 8. The systems 4–8 are constructed by a computer as its main element. These system are interconnected through a network formed by wired or radio lines shown by solid arrow lines in FIG. 1. The higher level system 4 includes a transmitter 41 which transmits the execution plan data to the respective systems 5–7 and warehousing plan data to the system 8. The systems 5, 6 and 7 include transmitters 51, 61 and 71, respectively, which transmit request instructions, which will be described later, to the respective subsystems. The systems 5, 6, 7 and 8 include displays 52, 62, 72 and 82, respectively, which display on their screens the contents of the received execution plan data and warehousing plan data. The displays 52, 62, 72 and 82 are provided in the main line 3, subline 2, kit field 1 and automatic warehouse 0, respectively, in such a manner that an operator can easily watch them.

Figure 3:
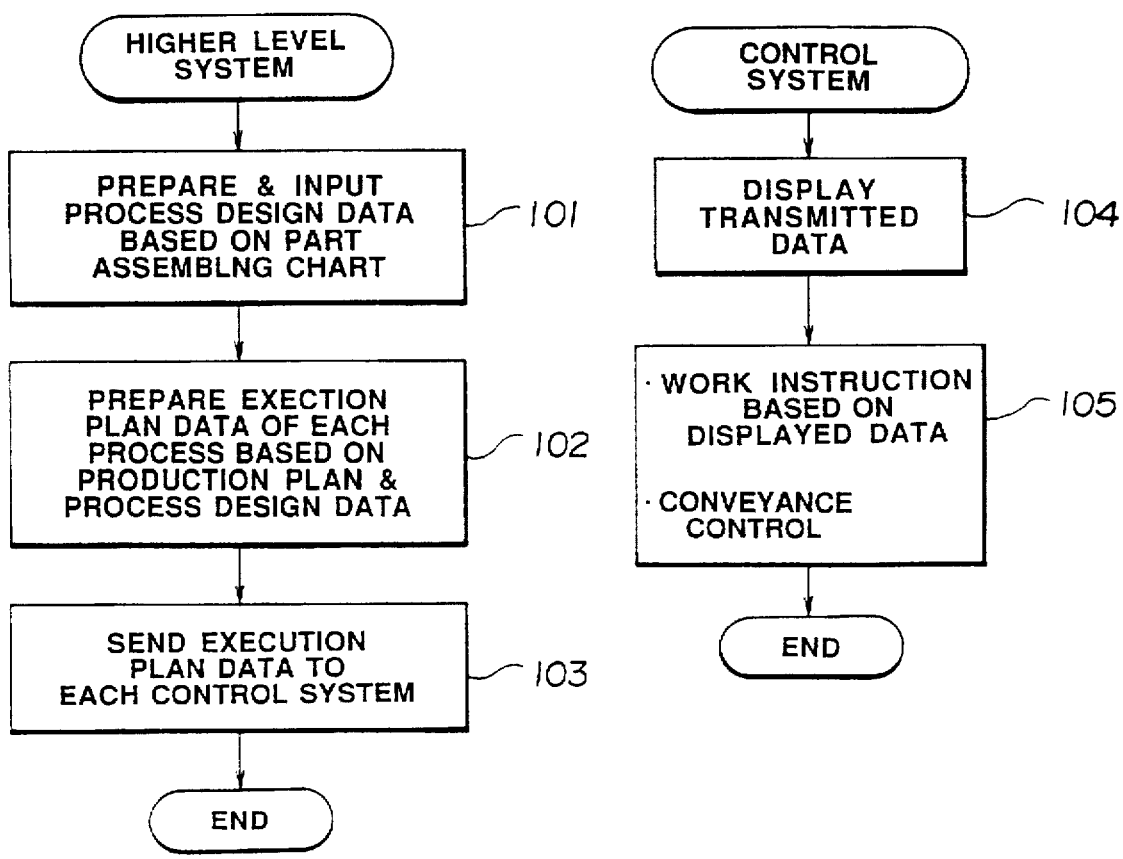
FIG. 3 is a flowchart illustrating procedure performed in the respective systems of the FIG. 1.

The processing performed by each of the systems 4–8 will be described below referring to the flowchart of FIG. 3.

First, the process preformed by the higher level system 4 will be described.

Preparation of Part Assembling Chart

It is assumed that many kinds of cars with article numbers XXX, YYY, ZZZ, . . . are produced.

Figure 4:
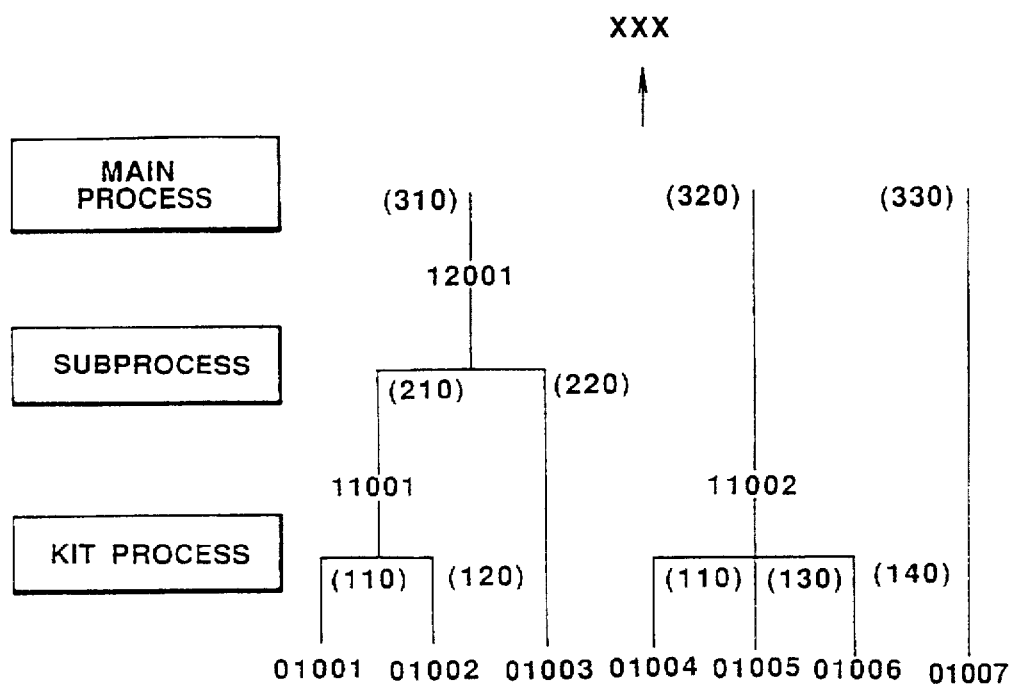
FIG. 4 illustrates the arrangement of parts constituting a product produced in the production line of FIG. 2.

A part assembling chart for indicating the flow of parts and semi-finished products is prepared for each kind of cars with article numbers XXX, YYY, ZZZ, . . . on the basis of data on the parts of the cars. FIG. 4 shows a part assembling chart which indicates the flow of the parts and semi-finished products for a car with the article number XXX. (FIG. 2 shows part supply route in the line.) Numerals in parentheses are the identification number of a station to which the parts and/or semi-finished products are fed by the carrier. The automatic warehouse 0 stores parts with article numbers "01001"–"01007" on the basis of which the product with the article number "XXX" is produced and transferred out of the line. As shown in FIG. 4, a semi-finished product is obtained at the kit field 1 by combining parts with a number "01001" and "01002" and the semi-finished product is numbered as "11001". Similarly, a semi-finished product is obtained at the kit field 1 by combining parts with numbers "01004", "01005" and "01006" and the semi-finished product is numbered as "11002". A semi-finished product is obtained at the subline 2 by combination of the semi-finished product with the number "11001" and a part with a number "01003" and it is numbered as "12001". The most significant two digits of the number represent the place where the part or semi-finished product is obtained and placed. Namely, 01=automatic warehouse 0

11=kit field 1

12=subline 2                                                 (1).

These two digits are called a supply supplier identification number. Thus, we obtain information that the semi-finished product with a number "12001" are processed by and placed on the subline 2 since the subline is indicated by "12".

A three-digit number is set as a destination identification number for indicating the next destination, that is, the next process and station where the next process is to be performed, as shown in parentheses in FIG. 4 for each of the parts and semi-finished products. The most significant digit of the 3-digit destination identification number shows the process to be performed in the destination. Namely, 1=kit field 1

2=subline 2

3=main line 3                                                (2).

For example, a semi-finished product with a number "12001" corresponds to an destination identification number "310" and is fed to a station 310 identified by 10 in the main line 3 which is indicated by "3". A part assembling chart similar to that of FIG. 4 is prepared for each of other types of cars YYY, ZZZ, . . . .

Preparation of Process Design Data

Figure 5:
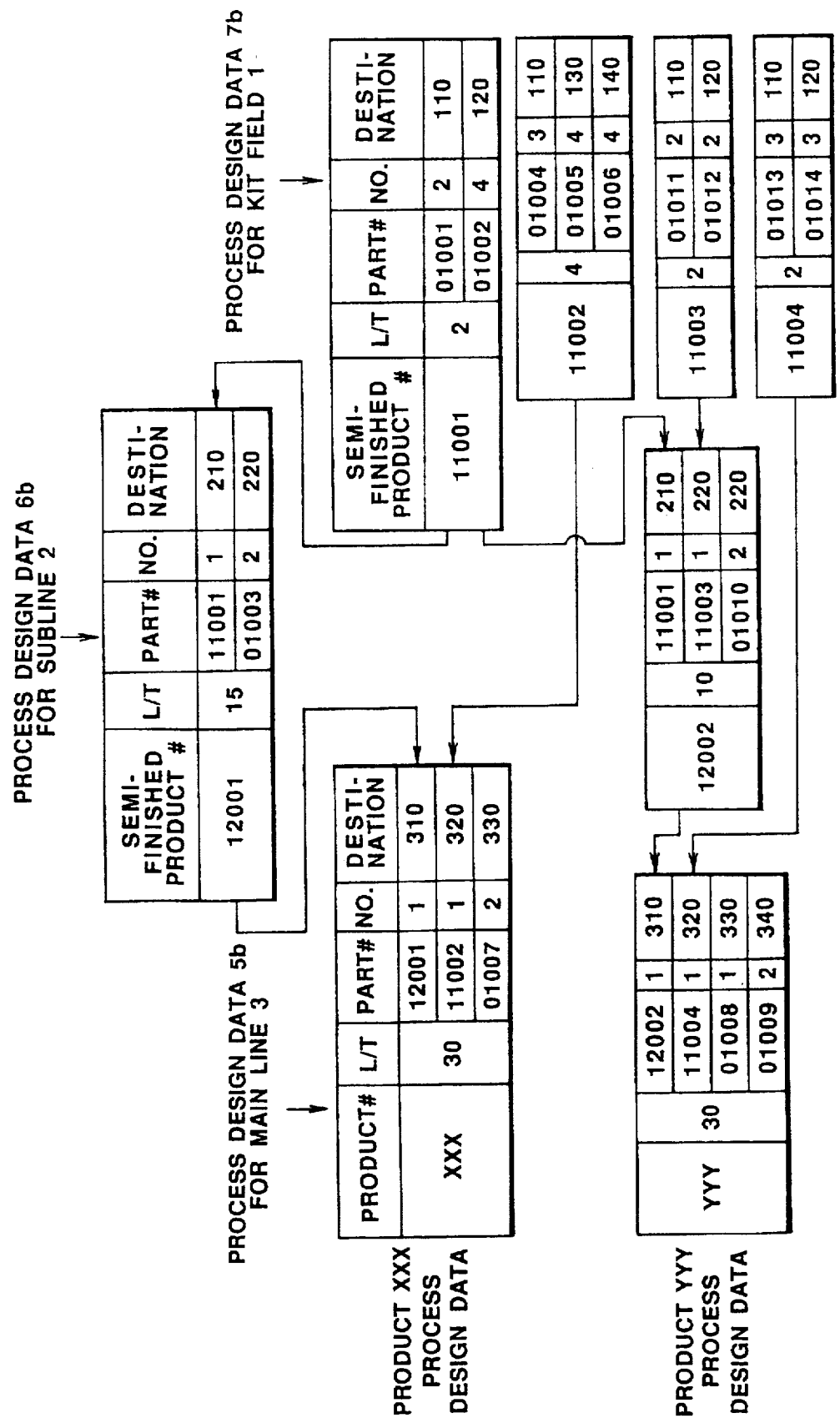
FIG. 5 illustrates process design data to be input to a higher level system of FIG. 1.

When the part assembling charts for every kinds of the products are prepared, process design data 5b, 6b and 7b for the respective systems 5–7 are prepared on the basis of the corresponding part assembling charts shown in FIG. 5. For example, in process design data 5b for the main line 3, a part or semi-finished product with a number where the most significant digit of a destination identification number is 3 is selected from the part assembling chart. For the article XXX, parts with numbers "12001", "11002" and "01007" are selected. As shown in FIG. 5, a semi-finished product with the number "12001" is fed to a station 310 in the main line 3, a semi-finished product with the number "11002" is fed to a station 320 in the main line 3, and a semi-finished product with the number "01007" is fed to a station 330 in the main line 3. Thus, the process of producing the article XXX from semi-finished products with the numbers "12001" and "11002" and the part with the number "01007" is formed as data. In this case, the semi-finished product with the number "12001" composing part of the article XXX is regarded as a part. Also, for the articles YYY, ZZZ, . . . , processes of production are formed as data. Thus, the process design data 5b for the main line 3 is prepared. In the same manner, a process design data 6b for the subline 2 is prepared. In this case, first, a part or a semi-finished product with a number where the most significant digit of a destination identification number is "2" is selected as required for assembly from the part assembling chart. A semi-finished product with a number where the supplier identification number is "12" is then selected from the part assembling chart. As a result, for the article XXX, a part and a semi-finished product with the numbers "11001" and "01003" are selected as being necessary and a semi-finished product with the number "12001" is selected as being assembled. Also, for the articles YYY, ZZZ, . . . , data is similarly formed and the process design data 6b for the subline 2 is formed. In the same manner, process design data 7b for the kit field 1 is formed as shown in FIG. 5.

As described above, assembling in one process (for example, in the subline 2) is represented by the article numbers of a plurality of kinds of parts and semi-finished products regarded as a "part", and the article number of one kind of semi-finished product (including a finished product) to be assembled. A semi-finished product with article number, for example, of "11001", in a process (for example, in the kit field 1) is regarded as a "part" for the next process (for example, in the subline 2) and specified by the number "11001", so that the connection between the preceding and current processes is simply represented by a solid arrow line. In other words, there is not such a case that a plurality of arrow lines are connected to the number "11001" in the subline 2. When common parts and/or semi-finished products are used in different kinds of products, for example XXX and YYY, the same article number (for example, "11001") is used and shown, for example, by a thick solid arrow line.

Although omitted in the part assembling chart, the number of parts required for assembly is entered for each article number of part in the process design data of FIG. 5. In addition, time taken required for producing a semi-finished product, that is, lead time L/T (minutes) is entered for each operation unit. For example, process design data 6b for the subline 2 for producing the article XXX includes information that a semi-finished product with article number "12001" should be produced in a lead time of 15 minutes by assembling one semi-finished product (regarded as the "part") with article number "11001" and two parts with article number "01003". The process design data 5b, 6b and 7b are input to the higher level system 4 (step 101).

Preparation of Execution Plan Data

Production plan data 4a of FIG. 6 is also input to the higher level system 4 in addition to the process design data prepared and input to the higher level system 4 at step 101. As shown in FIG. 6, the production plan data 4a includes the names of kinds of products XXX, YYY, ZZZ, . . . to be produced, the assembling sequence of producing these products (shown as 1, 2, 3, . . . in FIG. 6), the number of the products (although, in the embodiment, the number of a product for each kind is one for simplifying purposes, a plurality of products for each kind may be produced), and time when production of a product is expected to end (scheduled production end time). Execution plan data 5a, 6a and 7a for the main line control system 5, subline control system 6, and kit field control system 7 are prepared on the basis of the input process design data 5b, 6b and 7b, respectively, and the production plan data 4a as shown in FIGS. 7, 8 and 9. That is, as shown in FIG. 7, the execution plan data 5a for the main line is prepared on the basis of the name of a product, the sequence of assembly, and the scheduled production end time shown in the production plan data 4a and the process design data 5b. Although not shown in FIG. 7, the execution plan data 5a includes the scheduled operation start and end times for each operation (shown by the assembling sequence 1, 2, 3, . . . in FIG. 7). As shown in FIG. 8, execution plan data 6a for the subline is prepared on the basis of data on the name of a product, its assembling sequence and the scheduled production end time shown in the production plan data 4a, and the process design data 6b. In preparing the execution plan data 6a, the sequence of the operations (shown by the assembling sequence 1, 2, 3, . . . ) is determined so as to be in time for the scheduled operation start times of each subsequent operation shown in the execution plan data 5a for the main line on the basis of the lead time data shown in the process design data 6b. Further, the scheduled operation start and end times are set for those operations (not shown). As shown in FIG. 9, execution plan data 7a for the kit field is prepared on the basis of data on the name of the product, its assembling sequence, the scheduled production end time shown in the production plan data 4a, and the process design data 7b. In this case, the sequence of the respective operations (shown by the kit sequence 1, 2, 3, . . . ) is determined so as to be in time for the scheduled operation start time for each subsequent operation shown in the execution plan data 5a and 6a for the main line and subline, respectively on the basis of the lead time data shown in the process design data 7b. The scheduled operation start and end times are set for each operation (not shown). Although not shown, as an alternative to the execution plan data, warehousing plan data is prepared for the warehouse control system 8 on the basis of the production plan data 4a and process plan data 5b, 6b and 7b. The warehousing plan data is data on the numbers of the parts to be prepared for assembly of all the parts shown in the production plan data 4a. For example, the article numbers of parts required for production of the product XXX are "01001"–"01007" (step 102).

Transmission

When the respective execution plan data 5a–7a and warehousing plan data are prepared in the above manner, the transmitter 41 transmits those execution data 5a–7a and the warehousing plan data to the main line control system 5, the subline control system 6, the kit field control system 7, and the warehouse control system 8 (step 103).

Indication of Operations

The systems 5–8 display the contents of the respective plan data received from the transmitter 41 on displays 52–82 (step 104). By viewing those displays, the operator prepares for parts or semi-finished products required for each process and arranges for production of semi-finished products or finished products XXX, and more particularly, arranges for tools and/or jigs to be used. For example, in the subline 2, the contents of FIG. 8 are displayed, so that it will be known that the initial operation shown by the assembling sequence 1 is to arrange for receipt of a semi-finished product with the number "11001" from the kit field 2 shown by "11" and receipt of parts with the number "01003" from the automatic warehouse 0 shown by "01". The manner of conveyance of parts and a semi-finished product as the starting materials is possibly the operator's manual conveyance of the semi-finished product with the number "11001" and parts with the number "01003" from the preceding stage on the basis of the displayed contents of the display 62. This method is especially effective when the parts are large and cannot be conveyed by an unmanned carrier. In addition, tools and jigs are appropriately arranged for in accordance with the part numbers "11001" and "01003" and the number "12001" of an article produced. The pre-processing just mentioned above is performed rapidly and appropriately and the initial assembling is made. Thereafter, similarly, rapid appropriate pre-processing and operations are made sequentially for the respective assembling sequences 2, 3, 4, .... While description has been made of the subline 2, the contents of the received execution plan data are similarly displayed on the displays 52, 72 also in the main line control system 5 and the kit field control system 7, and pre-processing and assembling is made rapidly and appropriately on the basis of those displayed data. Alternatively, such pre-processing and assembling may be made automatically on the basis of the received contents of the data. In the warehouse control system 8, the operator issues to the conveyance control system 9 an instruction to feed required parts into the warehouse by viewing the contents of the warehousing plan data displayed on the display 82. As a result, the conveyance control system 9 controls the automatic warehouse 0 in a predetermined manner so as to feed and place required parts into and in position in the warehouse 0. Such warehousing operation may be performed automatically in accordance with the received contents of the data (step 105).

Conveyance Control

The conveyance of parts, semi-finished products, etc., by an unmanned carrier is made as follows. The assembling sequence 1 in the subline 2 will be described as an example. An operator inputs a request instruction that article no. is "11001", destination is "210" with input means such as a keyboard in the subline control system 6 by viewing the displayed contents on the display 62. The transmitter 61 transmits those contents to the kit field control system 7 shown by the supplier identification number "11". In addition, the operator also inputs a request instruction that the article no. is "01003", destination is "220" to cause the transmitter 61 to transmit those contents to the warehouse control system 8 shown by a supplier identification number "01". The kit field control system 7 receives that request instruction and issues to the conveyance control system 9 a convenience instruction to convey a semi-finished product with the number "11001" on an unmanned carrier to a station 21 of the subline 2 shown by "210". As a result, the travel of the unmanned carrier is controlled in a predetermined manner to convey the semi-finished product with the article number "11001" to the station 210 of the subline 2. The warehouse control system 8 similarly issues to the conveyance control system 9 a warehouse outgoing instruction and a conveyance instruction to feed a part with article number "01003" out of the automatic warehouse 0 in accordance with a request instruction and convey the part on the carrier to a station 220 of the subline 2. As a result, that part outgoes from the automatic warehouse 0 and conveyed by the unmanned carrier to that station. The main line control system 5 and the kit field control system 7 similarly issue request instructions to the corresponding preceding systems, which respond to those instructions to issue conveyance instructions to the conveyance control system 9. As a result, required materials are conveyed rapidly and appropriately to the succeeding stages.

Automatic transmission of a request instruction is possible in response to supply of the execution plan data 6a to the subline control system 6 instead of transmission of the instruction by the operators keying-in operation.

While description has been made assuming that there are parts and/or semi-finished products in the warehouse in the system which has received the request instruction, arrangement may be such that the subline control system 6, kit field control system 7 and warehouse control system 8 which receive request instructions count feed-out parts/semi-finished products to manage the number of parts/semi-finished products in the warehouse and set up a flag indicative of "there is stock (or no stock) in warehouse". If a flag indicating that "no stock in warehouse" is set up when a request instruction is received, a signal indicative of "refusal" may be sent back to the system which has issued the request instruction. Another arrangement may be such that when a conveyance instruction is issued to the conveyance control system 9 and the conveyance of the parts/articles concerned is completed, information that "the parts/articles are already conveyed" may be sent back to the system which has issued the request instruction (step 105).

While in the embodiment the supplier of parts/semi-finished products required for assembly has been displayed for each system, conversely, the destination of an already assembled semi-finished product (or parts stored in the automatic warehouse) may be displayed for each system. For example, for the kit sequence 1 of the execution plan data 7a of FIG. 9, a destination identification number 210 (the destination is a station 210 in the subline 2) is added further as data in correspondence to the semi-finished product with the number "11001". Thus, when such execution plan data and warehousing plan data are sent to the respective systems, the above operations are indicated and the conveyance control is provided in the following manner.

Indication of Operations

For example, when assembling a semi-finished product with the number "11001" is completed in the kit field 1, the operator views the display contents of the display 62 to recognize the destination "210" of the semi-finished product and arranges for feed of the article to the destination. This applies similarly to the main line 3, subline 2 and automatic warehouse 0.

Conveyance Control

When assembling the semi-finished product with the number "11001" is completed, the operator views the displayed contents of the display unit 62 to recognize the destination (210) of the semi-finished product and issues to the destination a supply instruction to indicate "the semi-finished product is feedable". When a process (subline) in the destination is required in response to that instruction, the destination issues to the conveyance control system 9 a conveyance instruction to convey a semi-finished product from the kit field 1 which has issued the instruction to the destination. This applies similarly to the main line 3, subline 2 and automatic warehouse 0.

The contents of the execution plan data 5a-7 and the warehousing plan data of this embodiment are only illustrative. Information on the names of the parts and semi-finished products and the kinds of jigs may be added to the above data in order to rapidly and properly perform a series of pre-processing, assembling and warehousing operations.

Since the respective main line, subline and kit and automatic warehouse control systems 5-8 operate on the basis of separate execution plan data and warehousing plan data in as in the system of the present embodiment, the function of each of the systems 5-8 can be realized by separate hardware. Thus, the present invention is easily adjustable to various production lines different in the kind and number of processes and is flexibly adaptable to a change in the structure of the production line.

The present invention is, of course, not limited to the car production line, but is applicable widely to production lines where various parts are combined in a plurality of processes such as assembling and welding.

INDUSTRIAL APPLICABILITY

As described above, according to the present invention, a semi-finished product produced at each process is specified with its article number, suppliers of parts and semi-finished products, and the destination of semi-finished products (or destination of parts) are specified with codes in each of the processes and warehouse, those specified data are classified and fed as plan data to the respective processes and warehouse, which indicate operations and provide conveyance control on the basis of the respective received plan data. Thus, a series of operations such as conveyance and working are performed at a high speed and in a proper manner. As a result, the production efficiency of the production line is greatly improved.

We claim:

1. A work instruction system in a production line in which finished products are produced by selectively combining various kinds of parts stored in a plurality of warehouses in a plurality of processes including a first process through a last process, comprising:

a supervisory system for the production line which includes:

first setting means for imparting an article number to each of the parts to be conveyed into one of the warehouses, the article number for each of the parts including a code which indicates one of the warehouses, and for imparting a second article number to each of finished or semi-finished products to be worked in one of the plurality of processes, the second article number including a code which indicates one of the processes;

second setting means for imparting process design data to each of the finished products, the process design data including a third article number of each of the finished products, second article numbers of semi-finished products and parts which constitute each of the finished products, a destination identification code indicative of a station of the last process to which the semi-finished products and parts which constitute each of the finished products are supplied, for imparting process design data to each of the semi-finished products, the process design data including an article number of each of the semi-finished products, a subsequent process destination identification code indicative of a station in a subsequent process to which each of the semi-finished products is to be supplied next, a second article number of each of various types of semi-finished products and parts which constitute each of the semi-finished products, and for imparting process design data to each of the parts, the process design data including an article number of each of the parts, a subsequent process destination identification code indicative of a station to which each of the parts is to be supplied next; and transmission means for transmitting to each of the processes the process design data imparted to each of the finished and semi-finished products which includes a code indicative of each of the finished and semi-finished products and transmitting to each of the warehouses the process design data imparted to an article having an article number including a code indicative of each of the warehouses, and display means provided for each of the processes and the warehouses, for displaying the data transmitted from the supervisory system, wherein in each of the processes, based on the process design data displayed on the display means in each of the processes, conveyance operations are instructed to convey various types of semi-finished products or parts constituting a finished or semi-finished product to be processed in each of the processes, from previous processes or warehouses corresponding to codes included in article numbers of the various types of semi-finished products or parts to a station of a process indicated by a corresponding destination identification code, and in each of the processes excluding the final process, conveyance operations are instructed to convey semi-finished products to be worked in each of the processes excluding the final process to a station of the subsequent process indicated by the subsequent process destination identification code imparted to each of the processes excluding the final process, and in each of the warehouses, based on a process design data displayed in the display means in each of the warehouses, conveyance operations are instructed to convey parts having article numbers to be conveyed to each of the warehouses, and further conveyance operations are instructed to convey the parts to a station of subsequent process indicated by the subsequent process identification code imparted to a part having an article number to be conveyed to the warehouse.

2. A conveyance control system in a production line in which a finished product is produced by sequentially and selectively combining a variety of parts stored in a warehouse in a plurality of processes including a first process through a last process, comprising:

a supervisory system for the production line which comprises:

first setting means for imparting an article number to each of the variety of parts to be conveyed into one of the warehouses, the article number for each of the parts including a code which indicates one of the warehouses, and for imparting a second article number to each of finished or semi-finished products to be worked in one of the plurality of processes, the second article number for each of the finished or semi-finished products including a code which indicates one of the processes;

second setting means for imparting process design data to each of the finished products, the process design data including a third article number of each of the finished products, second article numbers of semi-finished products and parts which constitute each of the finished products, a destination identification code indicative of a station of the last process to which the semi-finished products and parts which constitute each of the finished products are supplied, for imparting process design data to each of the semi-finished products, the process design data including an article number of each of the semi-finished products, a subsequent process destination identification code indicative of a station in a subsequent process to which each of the semi-finished products is to be supplied next, a second article number of each of various types of semi-finished products and parts which constitute each of the semi-finished products, and for imparting process design data to each of the parts, the process design data including an article number of each of the parts, a subsequent process destination identification code indicative of a station to which each of the parts is to be supplied next; and transmission means for transmitting to each of the processes the process design data imparted to each of the finished and semi-finished products which includes a code indicative of each of the finished and semi-finished products and transmitting to each of the warehouses the process design data imparted to an article having a first, second, or third article number including a code indicative of each of the warehouses;

conveying means for conveying the parts and the semi-finished products among the plurality of processes and among the warehouse; and conveyance control means, in each of the processes, for issuing request instruction based on the process design data transmitted to the each of processes, the request instruction requesting previous processes or warehouses corresponding to codes included in second article numbers of the various types of semi-finished products or parts constituting a finished or semi-finished product to be processed in each of the processes to convey the semi-finished products or parts of the article numbers to a station of a process indicated by a corresponding destination identification code, and, in each of the processes except for the last process, for issuing to a subsequent process indicated by a subsequent process identification code imparted to the semi-finished product a supply information indicative of the fact that a semi-finished product to be worked in each of the processes can be conveyed to a station of the subsequent process; in each of the warehouses, for issuing delivery instruction to the conveying means based on the article numbers transmitted to each of the warehouses, to deliver the parts corresponding to said article numbers to each of the warehouses, and further for issuing to a subsequent process indicated by a subsequent process identification code imparted to a part and supply information indicative of the fact that the part to be delivered to each of the warehouses can be conveyed to a station of the subsequent process; and for issuing a conveyance instruction to the conveyance means in each of previous processes or warehouses received the request instruction, to convey requested semi-finished products or parts to a station corresponding to the process that issued the request instruction, and further in the subsequent process received the supply information for issuing a conveyance instruction to the conveyance means to convey semi-finished products or parts that can be supplied to a station or warehouse corresponding to the process that issued the supply information.

* * * * *